US009721233B2

(12) United States Patent
Norton et al.

(10) Patent No.: US 9,721,233 B2
(45) Date of Patent: *Aug. 1, 2017

(54) JUST-IN-TIME CONFERENCE ROOM SCHEDULING

(71) Applicant: Google Inc., Mountain View, CA (US)

(72) Inventors: Kenneth S. Norton, San Carlos, CA (US); Charles Stephen Wiles, Guildford (GB)

(73) Assignee: Google Inc., Mountain View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/727,514

(22) Filed: Dec. 26, 2012

(65) Prior Publication Data

US 2013/0117059 A1    May 9, 2013

Related U.S. Application Data

(63) Continuation of application No. 12/695,142, filed on Jan. 27, 2010, now Pat. No. 8,346,589.

(51) Int. Cl.

| | | |
|---|---|---|
| *G06Q 10/10* | (2012.01) | |
| *G06Q 10/06* | (2012.01) | |
| *G06Q 10/02* | (2012.01) | |
| *G06Q 10/00* | (2012.01) | |

(52) U.S. Cl.
CPC ... *G06Q 10/1093* (2013.01); *G06Q 10/06314* (2013.01); *G06Q 10/109* (2013.01)

(58) Field of Classification Search
USPC ...................................................... 705/7.18
See application file for complete search history.

(56) References Cited

U.S. PATENT DOCUMENTS

| | | | |
|---|---|---|---|
| 5,050,077 A | 9/1991 | Vincent | |
| 6,064,976 A | 5/2000 | Tolopka et al. | |
| 7,343,312 B2 * | 3/2008 | Capek ................. | G06Q 10/109 |
| | | | 705/7.19 |
| 7,395,221 B2 | 7/2008 | Doss et al. | |

(Continued)

OTHER PUBLICATIONS

Google Inc, ISR/WO, PCT/US2011/020763, May 18, 2011, 9 pgs.

(Continued)

*Primary Examiner* — Mark A Fleischer
(74) *Attorney, Agent, or Firm* — Brake Hughes Bellermann LLP

(57) ABSTRACT

Systems and methods for just-in-time scheduling of conference rooms based on a plurality of conference room scheduling requests are provided. In some embodiments a plurality of conference room scheduling requests are obtained. A conference room scheduling request in the plurality of conference room scheduling requests includes at least one meeting constraint. The plurality of conference room scheduling requests is serviceable by a plurality of conference rooms. At least one conference room in the plurality of conference rooms is available for assignment. Prior to assigning the plurality of conference rooms in accordance with the plurality of conference scheduling requests, polling is conducted for a predefined trigger event corresponding to the at least one meeting constraint. In response to detecting the predefined trigger event, the plurality of conference rooms is assigned in accordance with the plurality of conference scheduling requests.

17 Claims, 8 Drawing Sheets

(56) References Cited

U.S. PATENT DOCUMENTS

| | | |
|---|---|---|
| 7,984,287 B2 | 7/2011 | Gopalakrishnan et al. |
| 2003/0149606 A1 | 8/2003 | Cragun et al. |
| 2005/0071213 A1 | 3/2005 | Kumhyr et al. |
| 2005/0273372 A1 | 12/2005 | Bowne et al. |
| 2006/0105315 A1 | 5/2006 | Shaver et al. |
| 2006/0271419 A1 | 11/2006 | O'Sullivan |
| 2006/0293943 A1* | 12/2006 | Tischhauser et al. ............ 705/9 |
| 2008/0133282 A1* | 6/2008 | Landar et al. .................... 705/5 |
| 2008/0133515 A1 | 6/2008 | Chien et al. |
| 2008/0140776 A1 | 6/2008 | Horvitz |
| 2008/0162198 A1* | 7/2008 | Jabbour ................ G06Q 10/02 705/5 |
| 2009/0006143 A1 | 1/2009 | Orttung et al. |
| 2009/0055234 A1 | 2/2009 | Li et al. |
| 2009/0089342 A1 | 4/2009 | Runstedler et al. |
| 2009/0112984 A1 | 4/2009 | Anglin et al. |
| 2009/0287629 A1* | 11/2009 | Gabriel et al. .................. 706/47 |
| 2009/0327227 A1 | 12/2009 | Chakra et al. |
| 2010/0017245 A1* | 1/2010 | Kristiansen ............ G06Q 10/02 705/5 |
| 2010/0088143 A1 | 4/2010 | Platt et al. |
| 2010/0153160 A1 | 6/2010 | Bezemer et al. |
| 2010/0274855 A1 | 10/2010 | Wassingbo |

OTHER PUBLICATIONS

Google Inc., Supplementary European Search Report, EP 11700595.9, Jun. 28, 2013, 4 pgs.

Google Inc., Communication pursuant to Article 94(3) EPC, EP 11700595.9, Feb. 27, 2014, 4 pgs.

Google Inc., Communication pusuant to Article 94(3) EPC, EP 11700595.9, Feb. 27, 2014, 4 pgs.

Advisory Action received for U.S. Appl. No. 13/591,144, dated Feb. 10, 2016, 3 pages.

Non Final Office Action from U.S. Appl. No. 13/591,144, dated Jul. 1, 2016, 29 Pages.

Final Office Action received for U.S. Appl. No. 13/591,144, dated Nov. 17, 2015, 24 pages.

* cited by examiner

JUST-IN-TIME CONFERENCE ROOM SCHEDULING

RELATED APPLICATIONS

This application is a continuation of and claims priority to U.S. patent application Ser. No. 12/695,142, filed Jan. 27, 2010, entitled "Just-In-Time Conference Room Scheduling," which is hereby incorporated by reference in its entirety.

TECHNICAL FIELD

The disclosed embodiments relate generally to conference room scheduling. More particularly, the disclosed embodiments relate to methods and systems for scheduling conference rooms in an electronic scheduling system.

BACKGROUND

Electronic conference room scheduling systems are heavily used in facilities with multiple conference rooms. Applications for electronic conference room scheduling systems are accessed from both desktop computers and portable computing devices (e.g., laptop computers, personal digital assistants (PDAs), mobile phones, and wearable computers).

One problem with conference room scheduling is that assignments of conference rooms on a first-come first-serve basis often lead to situations where conference rooms are not optimally assigned (e.g., a small number of people booking a large conference room, and as a result, a meeting with a large group of participants cannot find a suitable conference room). Another problem is that once conference rooms are assigned, it is difficult to reallocate conference rooms when there is a significant event (e.g., multiple people are added to a meeting already booked to a small conference room). Therefore, there is a need for a new method and system for scheduling conference rooms.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for just-in-time conference room scheduling.

In some embodiments, a method for just-in-time conference scheduling includes obtaining a plurality of conference room scheduling requests, where (a) a first conference room scheduling request in the plurality of conference room scheduling requests includes at least one meeting constraint, (b) the plurality of conference room scheduling requests is serviceable by a plurality of conference rooms, and (c) at least one conference room in the plurality of conference rooms is available for assignment. Prior to assigning the plurality of conference rooms in accordance with the plurality of conference scheduling requests, polling is conducted for a predefined trigger event corresponding to the at least one meeting constraint. In response to detecting the predefined trigger event: the plurality of conference rooms is assigned in accordance with the plurality of conference scheduling requests.

In some embodiments, the predefined trigger event is one of: (i) an expiration of a predefined time interval before a meeting start time associated with a conference room scheduling request in the plurality of conference room scheduling requests or (ii) at least one participant associated with the a conference room scheduling request in the plurality of conference room scheduling requests reaching a predefined physical location.

In some embodiments, assigning the plurality of conference rooms in accordance with the plurality of conference scheduling requests includes: assigning the plurality of conference rooms in accordance with both the predefined trigger event and the plurality of conference scheduling requests.

In some embodiments, the method further include selecting a combination of conference room assignments, for the plurality of conference room scheduling requests, in accordance with conference room assignment fitness scores for each of a plurality of potential combinations of conference room assignments; and assigning the plurality of conference rooms to one or more requests in the plurality of conference room scheduling requests in accordance with the selected combination. In some embodiments, an assignment fitness score is calculated based, at least in part, on an invitee's likelihood to attend a meeting corresponding to the conference room scheduling request in the plurality of conference room scheduling requests, or on the invitee's geographical proximity to a requestor issuing a conference room scheduling request in the plurality of conference room scheduling requests.

In some embodiments, the method optionally includes, prior to detecting the predefined trigger event, generating an initial conference room assignment satisfying a conference room request in the plurality of conference room scheduling requests.

Conference room scheduling systems and computer readable storage mediums including one or more programs, configured for execution by a computer, for performing one or more steps of the above described methods are also disclosed.

BRIEF DESCRIPTION OF THE DRAWINGS

For a better understanding of the aforementioned aspects of the present disclosure as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Figure 1:
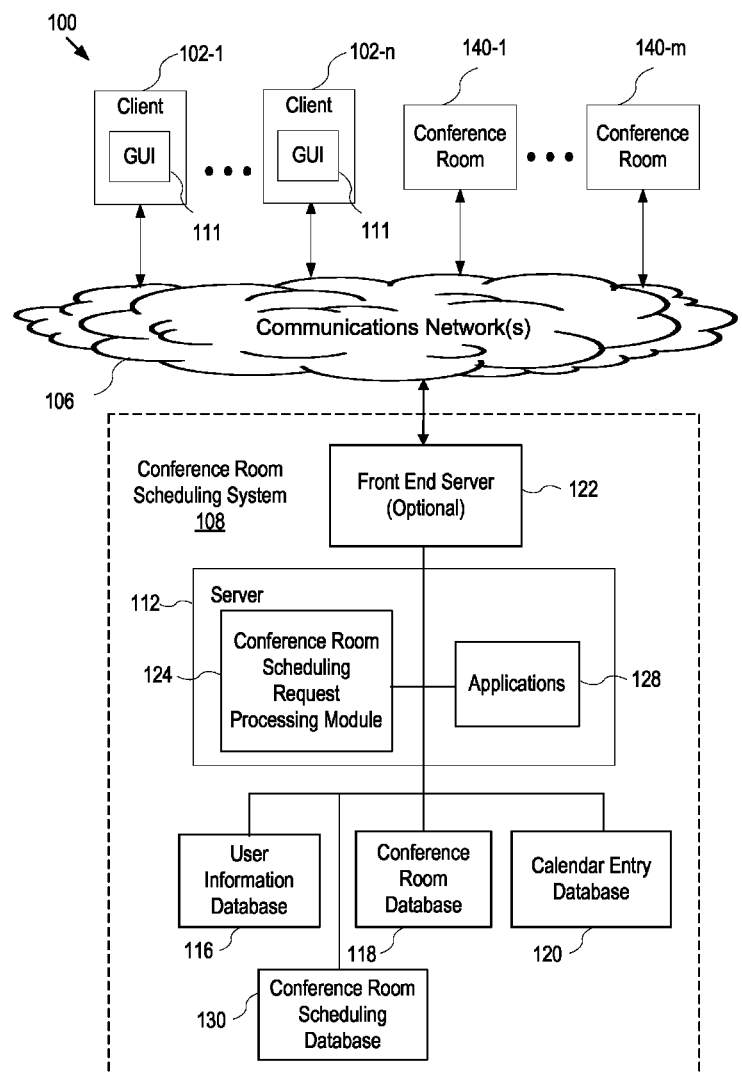
FIG. 1 is a block diagram illustrating an exemplary distributed computer system in accordance with some embodiments.

Methods and systems for just-in-time scheduling of conference rooms are described. Reference will be made to certain embodiments of the present disclosure, examples of which are illustrated in the accompanying drawings. While the present disclosure will be described in conjunction with the disclosed embodiments, it will be understood that it is not intended to limit the present disclosure to these particular embodiments alone. On the contrary, the present disclosure is intended to cover alternatives, modifications and equivalents that are within the spirit and scope of the present disclosure as defined by the appended claims.

Moreover, in the following description, numerous specific details are set forth to provide a thorough understanding of the present disclosure. However, it will be apparent to one of ordinary skill in the art that the disclosed embodiments may be practiced without these particular details. In other instances, methods, procedures, components, and networks that are well-known to those of ordinary skill in the art are not described in detail to avoid obscuring aspects of the present disclosure.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present disclosure. The first contact and the second contact are both contacts, but they are not the same contact.

The terminology used in the description of the embodiments herein is for the purpose of describing particular embodiments only and is not intended to be limiting of the present disclosure. As used in the description of the present disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term, "requester" is used to mean a person scheduling, initiating, or organizing a meeting.

As used herein, the terms, "meeting" and "event" are used interchangeably to mean a calendar event involving one or more participants. As used herein, "meetings" can include both single-participant meetings (e.g., a person reserving a conference room for a video or audio conference), and multiple-participant meetings.

As used herein, the terms "invitee" and "potential participant" have been used interchangeably to mean people invited to an event, irrespective of whether they have accepted, declined, or not yet responded to the invitation.

As used herein, the term "required attendee" is used to mean invitees whose attendance a requester has identified as required, irrespective of whether they have accepted, declined, or not yet responded to the invitation. As used herein, the term, "optional attendee" has been used to mean invitees whose attendance a requester has identified as optional, irrespective of whether they have accepted, declined, or not yet responded to the invitation.

As used herein, the term "conference room amenities" is used to mean furnishings, equipment, and/or functions in conference rooms, such as one or more of: tables, chairs, desks, podium, blackboard, whiteboard, electronic whiteboard, overhead projector, slide projector, video monitor, video camera, video conferencing equipment, television, video cassette recorder (VCR), digital video disc (DVD) player, compact disc (CD) player, tape player, tape recorder, computer, network lines, phone, fax, sound system, flip charts, telecommunication equipment, and access to a wireless network. In some embodiments, the "conference room amenities" comprise a requester-selectable group of amenities that include at least two or more of: chairs (e.g., number of chairs), overhead projector, video monitor, video conferencing equipment, blackboard, whiteboard, and electronic whiteboard.

FIG. 1 is a block diagram illustrating an exemplary distributed computer system 100, according to certain embodiments. In FIG. 1, system 100 includes one or more client computers 102, a communications network 106, and a conference room scheduling system 108. Various embodiments of the conference room scheduling system 108 implement the conference room scheduling methods described in this document.

Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). Client 102 includes a graphical user interface (GUI) 111. Client 102 is described in greater detail below with reference to FIG. 3. Client 102 is connected to conference room scheduling system 108 via communications network 106. As described in more detail below, the GUI 111 is used to display calendar event information, including a conference room assignment. The conference room scheduling system 108 provides scheduling services to a community of users (e.g., the employees of a company, the members of an organization or group, the users of a facility, etc.) who access the conference room scheduling system from the clients 102.

Conference room scheduling system 108 includes one or more servers, such as server 112, connected to the communications network 106. Optionally, the one or more servers are connected to the communications network 106 via a front end server 122 (e.g., a server that conveys (and optionally parses) inbound requests to the appropriate server of the system 108, and that formats responses and/or other information being sent to clients in response to requests).

The front end server 122, if present, may be a web server providing web based access to the conference room scheduling system 108. The front end server 122, if present, may also route communications to and from other destinations, such as a calendaring system.

Conference room scheduling system 108 includes a user information database 116, a conference room database 118, calendar entry database 120, and a conference room scheduling database 130. In some embodiments, conference room scheduling system 108 also includes or has access to one or more other databases, such as a conference room scheduling request queue (e.g., Request Queue 502 in FIG. 5). Server 112 includes a conference room scheduling request processing module 124 and applications 128. Server 112 communicates with databases internal to the conference room scheduling system 108, such as user information database 116, conference room database 118, calendar entry database 120, and conference room scheduling databases 130, and in some embodiments, conference room scheduling request queue (e.g., Request Queue 502 in FIG. 5) using a local area network, by internal communication busses, or by any other appropriate mechanism or combination of mechanism.

Server 112 communicates with clients 102 via the front end server 122 (if present) and communication network(s) 106. In some embodiments, the communications network 106 is the Internet. In other embodiments, the communication network 106 can be any local area network (LAN), wide area network (WAN), metropolitan area network, or a combination of such networks. In some embodiments, server 112 is a Web server that manages conference room schedules using appropriate communication protocols. Alternatively, if server 112 is used within an intranet, it may be an intranet server.

Applications 128 include application programs used for managing an online conference room scheduling system. In some embodiments, applications 128 also include a user information processing module, where the user information processing module assists in accessing and updating user information database 116. User information database 116 stores various information associated with the users of the conference room scheduling system 108, including user preferences, default locations, and optionally other information such as user ranks. In some other embodiments, calendar entry database 120 store information (e.g., metadata) concerning various types of calendars as well as data (e.g., calendar data, also called calendar entry data, event data, or calendar event data) from various calendars.

Conference room scheduling request processing module 124 retrieves stored conference room scheduling information. Conference room scheduling request processing module 124 assists in accessing and updating conference room scheduling database 130, and in some embodiments, conference room scheduling request queue (e.g., Request Queue 502 in FIG. 5). In some other embodiments, conference room scheduling request processing module 124 also assists in accessing, updating and modifying conference room database 118.

In some embodiments, conference room database 118 stores information (e.g., metadata) concerning various types of conference rooms (e.g., location, such as city, campus, campus sub-region, building, floor, and/or building sub-region; conference room capacity; conference room amenities (see definition provided above)). In some other embodiments, conference room database 118 also stores information about proximity to other facilities, such as restrooms, water fountains, vending machines, elevators, and emergency exits.

Figure 4:
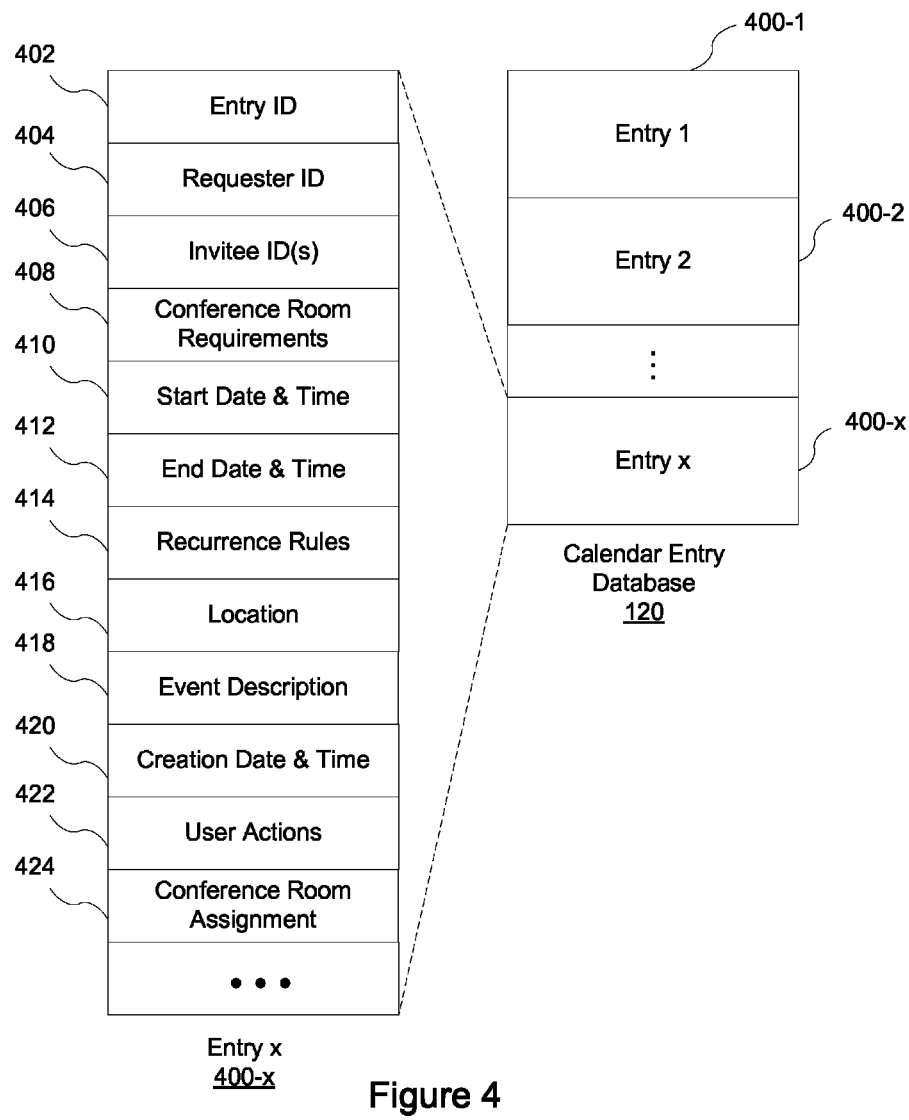
FIG. 4 is a block diagram illustrating an exemplary calendar entry database and an exemplary entry in the calendar entry database, in accordance with some embodiments.
Figure 5:
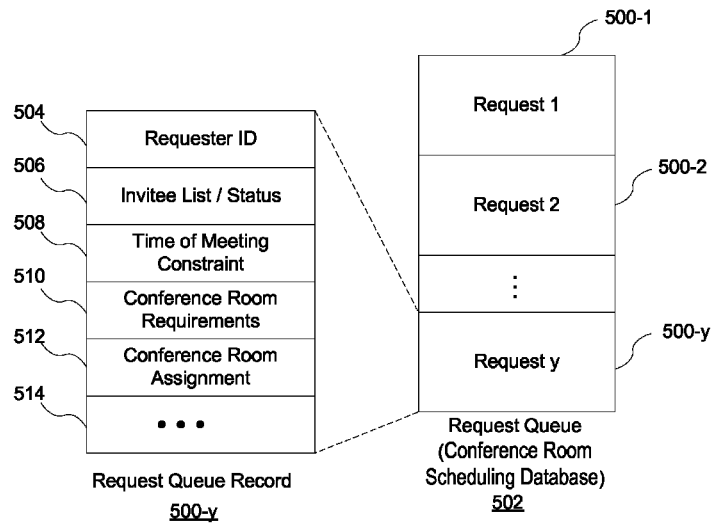
FIG. 5 is a block diagram illustrating an exemplary request queue and an exemplary request queue record for the request queue, in accordance with some embodiments.

In various embodiments, conference room scheduling requests are stored in one or more of conference room database 116, conference room scheduling database 130, calendar entry database 120, and a conference room scheduling request queue (e.g., Request Queue 502 in FIG. 5). In various embodiments, information concerning conference room assignments is stored in one or more of conference room scheduling database 130 and calendar entry database 120 (see FIG. 4).

In some embodiments, the user information database 116 includes user information records having information relevant to the assignment of conference rooms to conference room scheduling requests. For example, the user information record for a respective user may include, in addition to identifying information for the user, a default location (e.g., the location of the user's office), and user preferences (e.g., mobility limitations, conference room location preferences, conference room amenity preferences, etc.). Optionally, the user information record for a respective user further includes the user's rank (e.g., a priority level or other priority value for conference room scheduling, rank in an organization, rank in an organization chart, etc.).

In essence, server 112 is configured to manage certain aspects of conference room scheduling system 108, including transmitting conference room assignment data on conference room scheduling database 130 in conference room scheduling system 108 to a respective client 102.

Optionally, the conference room scheduling system 108 is implemented as part of a calendaring system that provides calendaring services to a community of users (e.g., the employees of a company, the members of an organization or group, the users of a facility, etc.).

Optionally, conference rooms 140 are connected to conference room scheduling system 108 via communications network 106. In some embodiments, conference room 140 includes network communication equipment (not shown). In some embodiments, conference room 140 includes a sensor to detect the presence of a person in the respective conference room 140, optionally includes one or more other sensors to monitor the operational status of amenities (e.g., projector(s), lighting, temperature, electronic white board, etc.) in the respective conference room 140, and includes equipment for transmitting information associated with the presence of a person and/or the status of the conference room amenities to conference room scheduling system 108 via communications network 106.

In some embodiments, a badge reader (not shown) is connected to conference room scheduling system 108 via communications network 106. The badge reader retrieves identity information stored in a badge and transmits the information to conference room scheduling system 108 via communications network 106. Optionally, other equipment, such as radio-frequency identification devices, biometric readers including fingerprint scanners and retinal scanners, and face identification device; or sensors, such as proximity sensors and motion detectors, can be configured to transmit information to conference room scheduling system 108 via communications network 106. In these embodiments, the information transmitted to the conference room scheduling system 108 includes one or more of: information indicating that a respective conference room is in use, the number of participants in the conference room, and the identity of one or more of the participants in the conference MOM.

In some embodiments, fewer and/or additional modules, functions or databases are included in conference room scheduling system 108 and server 112. The modules shown in conference room scheduling system 108 and server 112 represent functions performed in certain embodiments.

Figure 2:
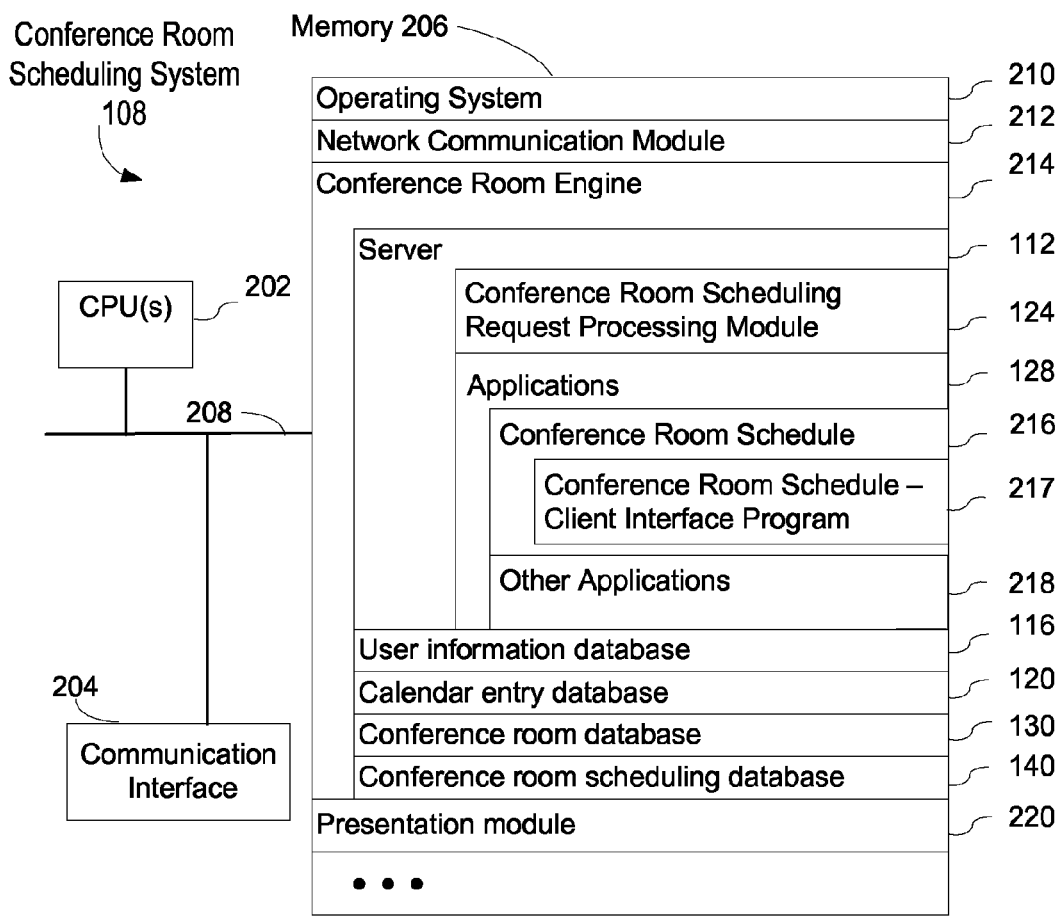
FIG. 2 is a block diagram illustrating a conference room scheduling system in accordance with some embodiments.

FIG. 2 is a block diagram illustrating conference room scheduling system 108 in accordance with some embodiments. The conference room scheduling system 108 typically includes one or more processing units (CPUs) 202, one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, the conference room scheduling system 108 includes a user interface (not shown) (e.g., a user interface having a display device, a keyboard, and a mouse or other pointing device), but more typically the conference room scheduling system 108 is controlled from and accessed by various client systems.

Memory 206 of conference room scheduling system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a computer readable storage medium. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting the conference room scheduling system 108 to other computers (e.g., clients 102) via the one or more communications interfaces 204 and one or more communications networks 106 (FIG. 1), such as the Internet, other wide area networks, local area networks, metropolitan area networks, and so on;
- Conference Room Engine 214 that receives conference room scheduling requests from and provides responses to clients 102; and
- Presentation module 220 that formats results from Conference Room Engine 214 for display at respective clients; for example, presentation module 220 may generate a web page or XML document that includes conference room assignment information; in some embodiments presentation module 220 is executed by the front end server 122, which comprises one of the servers implementing the conference room scheduling system; optionally the presentation module 220 is a module of the conference room engine 214.

In some embodiments, Conference Room Engine 214 includes the following programs, modules and data structures, or a subset or superset thereof:

- a server 112 for managing certain aspects of conference room scheduling system 108 including a conference room scheduling request processing module 124, and applications 128, including a conference room schedule application 216 for performing the primary functions of an online conference room scheduling system; the conference room schedule application 216 includes a conference room schedule-client interface program (or module) 217 for receiving conference room scheduling requests from and generating responses to the requests, and may optionally include other applications 218;
- User information database 116 that stores records for users;
- Calendar entry database 120 that stores calendar entries, and possibly other calendar data as well (e.g., information identifying the sources of externally generated calendar events, subscriber information, etc.);
- Conference room database 118 that includes information concerning various types of conference rooms (e.g., location, conference room capacity, and conference room amenities); and
- Conference room scheduling database 130 that includes conference room assignments.

In some embodiments, conference room scheduling database 130 includes a conference room scheduling request queue, described below with reference to FIG. 5.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, user information database 116 is part of or stored within server 112. In other embodiments, user information database 116 is implemented using one or more servers whose primary function is to store and process user information. In some embodiments, conference room scheduling database 130 includes calendar entry database 120, or vice versa. Similarly, conference room scheduling database 130 can be implemented on one or more servers.

The actual number of servers used to implement a conference room scheduling system 108 and how features are allocated among them will vary from one implementation to another, and may depend in part on the amount of data traffic that the system must handle during peak usage periods as well as during average usage periods, and may also depend on the amount of data stored by the conference room scheduling system. Moreover, one or more of the blocks in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa.

Figure 3:
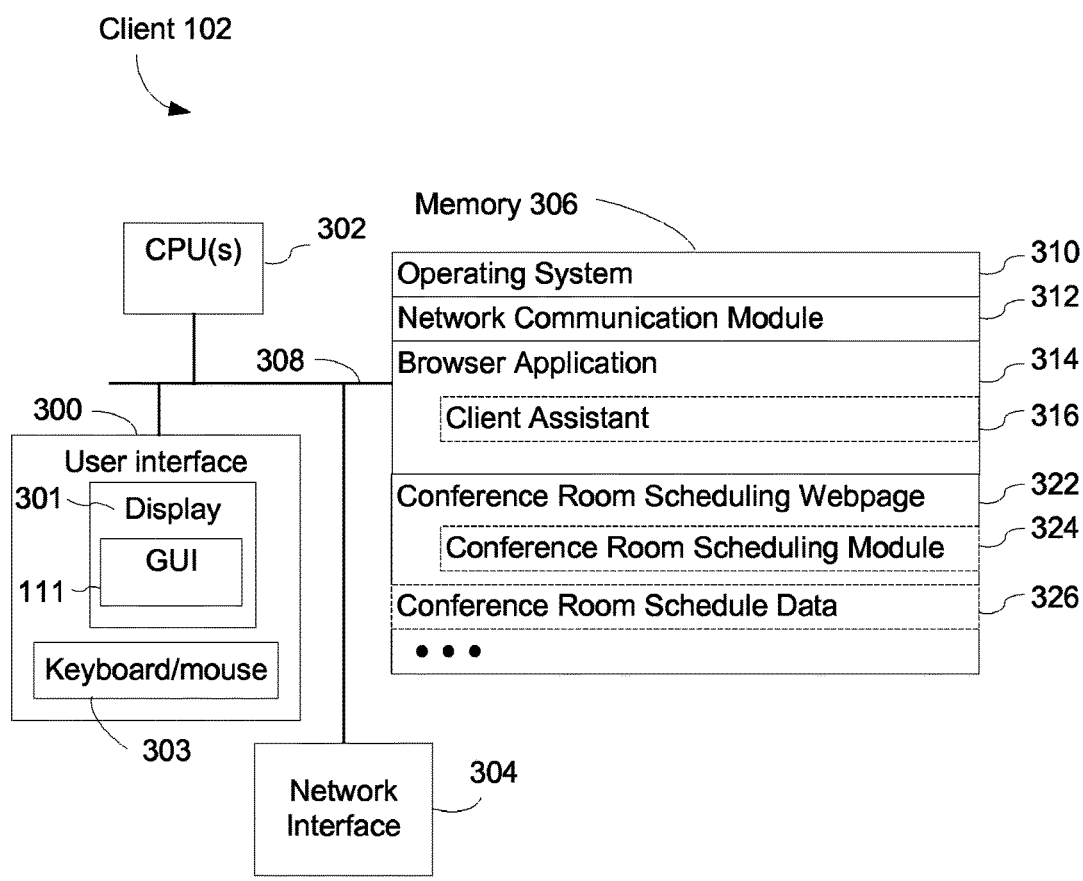
FIG. 3 is a block diagram illustrating a client, in accordance with some embodiments.

FIG. 3 is a block diagram illustrating a client, also called client systems or client devices, in accordance with some embodiments. The clients 102 as shown in these figures are configured for use by a subscriber (also herein called "the user") of the conference room scheduling system 108. The client includes a graphical user interface 300, which typically includes a display device 301, and one or more input devices 303 such as a keyboard and a mouse or other pointing device. As noted above, client 102 includes a graphical user interface (GUI) 111, which is displayed on the display device 301. Client 102 typically includes one or more processing units (CPUs) 302, one or more network or other network communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting client 102 to other computers (e.g., conference room scheduling system 108 and other clients 102) via the one or more communications Network Interfaces 304 (wired or wireless) and one or more communication networks 106 (FIG. 1), such as the Internet, other wide area networks, local area networks, metropolitan area networks, and so on;
- Browser Application 314; optionally, the browser application 314 or an extension, plug-in or toolbar of the browser application includes an client assistant 316 that handles data formatting and/or management tasks, at least some of which would otherwise be handled by presentation module 220 (FIG. 2);
- Conference Room Scheduling Webpage 322, which is a webpage received from the conference room scheduling system 108, for receiving scheduling-related input from a computer user (e.g., a request to schedule a conference room or to retrieve a conference room schedule data) and for presenting conference room schedule data in GUI 111; webpage 322 optionally includes an embedded Conference Room Scheduling Module 324, for receiving scheduling-related input from a computer user and for formatting conference room schedule data for display in GUI 111; and
- (optional) Conference Room Schedule Data 326, which is a locally stored subset of the user's conference room assignments; the conference room schedule data 326 may optionally include additional data. The additional data, if stored at the client 102, includes information such as a subset of the requester information, information associated with the meeting, directions to the conference room, conference room amenities and/or information associated with amenities missing from the assigned conference room (e.g., "You requested a projector, but the assigned conference room does not have a projector. Please prepare for the meeting accordingly.").

In some embodiments, the client 102 may be a "thin client," which includes a browser application 314 that displays the conference room scheduling webpage 322 received from the conference room scheduling system 108. In this embodiment, the client 102 only displays the conference room scheduling webpage, and executes programs, if any, embedded within the conference room scheduling webpage 322, but does not include additional software. In some embodiments, programs embedded within the conference room scheduling webpage format conference room schedule data for display. In thin client embodiments, schedule related processing other than user data input and conference room and conference room schedule data display are handled by the conference room scheduling system 108.

FIG. 4 is a block diagram illustrating an exemplary calendar entry database 120 and an exemplary calendar entry record 400-x in accordance with some embodiments. Calendar entry database 120 stores calendar entry records 400, for example entry 1 (400-1) through entry x (400-x), where x represents the number of entries (or the number of entries for a respective user, or the number of entries in a local calendar database at a client 102). A calendar entry 400 includes information for an event, sometimes called a calendar event, such as a meeting or a conference room reservation. Typically, each of the conference room requests discussed elsewhere corresponds to one of the calendar event entries in the calendar entry database 120.

A calendar entry (e.g., entry x 400-x) includes the following data for a calendar event, or a subset or superset thereof:

- Entry ID 402 that uniquely identifies this calendar entry, which corresponds to a particular calendar event;
- Requester ID(s) 404 that identifies the requester (or an event organizer) associated with the calendar entry;
- Invitee ID(s) 406 that identifies the invitee(s) associated with the calendar entry; the information in this field optionally identifies required attendees, optional attendees, and guests/participants;
- Conference room requirements 408, if any (e.g., requested amenities for the conference room);
- Start date and time 410 of the event;
- End date and time 412 of the event;
- Recurrence rules 414 (if any) for the event (e.g., whether the meeting occurs only once, daily, weekly, every other week, monthly, yearly etc. and the end date for the recurrence);
- Location 416 (e.g., building, campus, city, address, etc.) of the event;
- Event description 418 (e.g., title; description details; color coding; icon, if any, added to the event; event creator specified event importance, etc.); and
- Creation date and time 420;
- User actions 422 (if any) with respect to the event, such as: information indicating which invitees of an event accepted, declined or tentatively accepted an invitation to the event; attending or not attending the event (if such information is available); user feedback, such as proposal to change the meeting date or time. User actions may also include other user actions, such as replies, comments, or deletion.
- Conference room assignment 424 that identifies the conference room assigned to a respective conference room scheduling request.

In some embodiments, an Entry 400-x includes a pointer to a corresponding conference room scheduling request (e.g., Request Queue Record 500-y (FIG. 5)). In some embodiments where Recurrence rules 414 is set for recurrence (e.g., daily, weekly, every other week, monthly, yearly, etc.), an Entry 400-x includes a plurality of pointers to a plurality of records in the Request Queue 502 in accordance with the number of recurrences. In some embodiments where Recurrence rules 414 do not have an end date for the recurring meeting, the number of pointers to records in the Request Queue 502 is limited to a predefined threshold.

In some embodiments, a separate calendar entry database is maintained for each registered user of the system, while in other embodiments the calendar entry database 120 records events for multiple users.

FIG. 5 is a block diagram illustrating an exemplary request queue 502 and an exemplary request queue record 500-$y$ for a request queue in accordance with some embodiments. The request queue 502 stores request queue records, for example request queue record 500-1 through request queue record 500-$y$, where y may represent the number of conference room scheduling requests. In some embodiments, the request queue is a part of conference room scheduling database 130. In other embodiments, the request queue is separately maintained.

In some embodiments, a request queue record (e.g., Request Queue Record 500-$y$) for a respective conference room scheduling request includes the following data, or a subset or superset thereof:
  Requester ID 504 that uniquely identifies a particular user (e.g., an n-bit binary number or an email address) who requested a conference room; typically the requester ID 504 corresponds to a user record in the user information database 116, which may specify user preferences for this user (i.e., the requester in this instance);
  Invitee List and Status 506 identifies the invitee(s) associated with a calendar event that corresponds to the conference room request and this entry 500-$y$; the invitee list may comprise user IDs, email addresses or the like; the status information, if provided, indicates which invitee(s) have accepted or declined the invitation;
  Time of Meeting Constraint 508, including at least one of the start date and time of the meeting, the end date and time of the meeting, and the duration of the meeting;
  Conference room requirements 510 (e.g., one or more of: requested amenities for the conference room, requested room capacity, requested location, a number of the invitees who have accepted an invitation to the respective meeting; proximity to the requester; and requester preferences); and
  Conference room assignment 512 that identifies the conference room assigned to a respective conference room scheduling request; this field may be null, or unassigned, until a conference room is assigned to the request.

In some embodiments, conference room scheduling requests (and request queue records) have a plurality of constraints, including at least a list of invitees and at least one time-of-meeting constraint. In some embodiments, request queue records include information associated with the plurality of constraints. In some other embodiments, request queue records include pointers to other databases (e.g., user information database 116) which store information associated with at least a subset of the plurality of constraints.

In some embodiments, the Invitee List and Status 506 includes a value corresponding to the importance of each invitee (e.g., required attendee, optional attendee, and guest/participant). In other embodiments, the Invitee List and Status 506 includes the rank of each invitee.

In some embodiments, the request queue record 500-$y$ includes a pointer or link to a corresponding event entry in the calendar entry database 120. In some other embodiments, the request queue record 500-$y$ does not include at least a subset of information already included in the corresponding entry in the calendar entry database 120.

Figure 6:
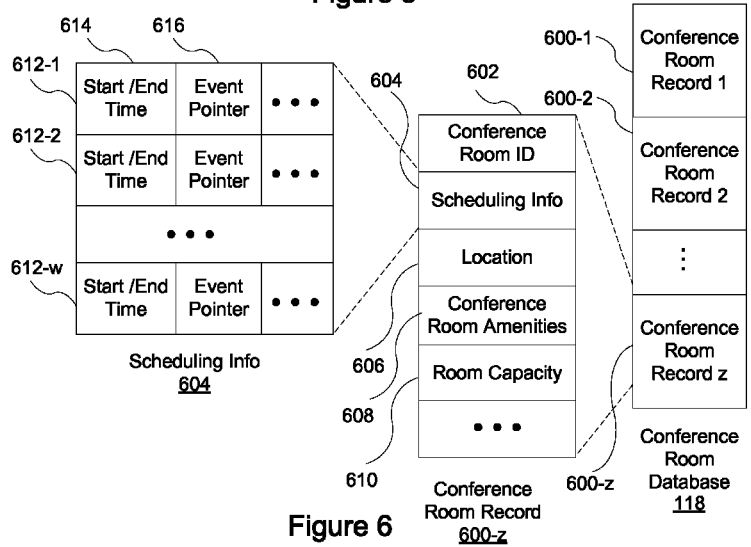
FIG. 6 is a block diagram illustrating an exemplary conference room database, an exemplary conference room record in the conference room database, and exemplary scheduling information in the conference room record, in accordance with some embodiments.

FIG. 6 is a block diagram illustrating an exemplary conference room database 118, an exemplary conference room record 600-$z$, and exemplary conference room scheduling information 604, in accordance with some embodiments. The conference room database 118 stores conference room record 600-$z$, where z represents the number of conference rooms. Therefore, a respective conference room record 600-$z$ stores information associated with a corresponding conference room. The conference room record 600-$z$ optionally stores conference room scheduling information 604.

In some embodiments, a conference room record (e.g., conference room record 600-$z$) includes the following data, or a subset or superset thereof:
  Conference Room ID 602 that uniquely identifies a conference room (e.g., an n-bit binary number or a building and room number);
  Scheduling information 604;
  Location 606 (e.g., city, campus, building, floor, section or sub-region of the building, and room number);
  Conference Room Amenities 608 that identifies amenities of the respective conference room; and
  Room Capacity 610 (e.g., the number of people allowed to fit into the conference room).

In embodiments that include scheduling information within a conference room record 600, scheduling information 604 includes conference room scheduling records 612, for example conference room scheduling records 612-1 through 612-$w$, each of which represents a conference room reservation, where w represents the number of conference room scheduling records in respective scheduling information 604.

In some embodiments, conference room scheduling records (e.g., conference room scheduling records 612-1 through 612-$w$) include the following data, or a subset or superset thereof:
  Meeting Start and End Time 614; and
  Event Pointer 616 that points or links to a corresponding entry in Calendar Entry Database 120.

In some other embodiments, conference room scheduling records (e.g., Conference Room Scheduling Records 610) also include pointers or links to corresponding conference room scheduling requests in request queue records 502.

In some embodiments, conference room scheduling request processing module 124 accesses, updates, and modifies conference room database 118. In one example, conference room scheduling request module 124 retrieves one or more of: conference room amenities 608, room capacity 610, and scheduling information 604. In another example where the conference room database 118 includes scheduling info 604, conference room scheduling request module 124 updates or modifies the scheduling information 604 in the conference room database 118 by adding, removing, and/or updating conference room scheduling records 612 to reflect a newly scheduled or modified conference room reservation.

Figure 7A:
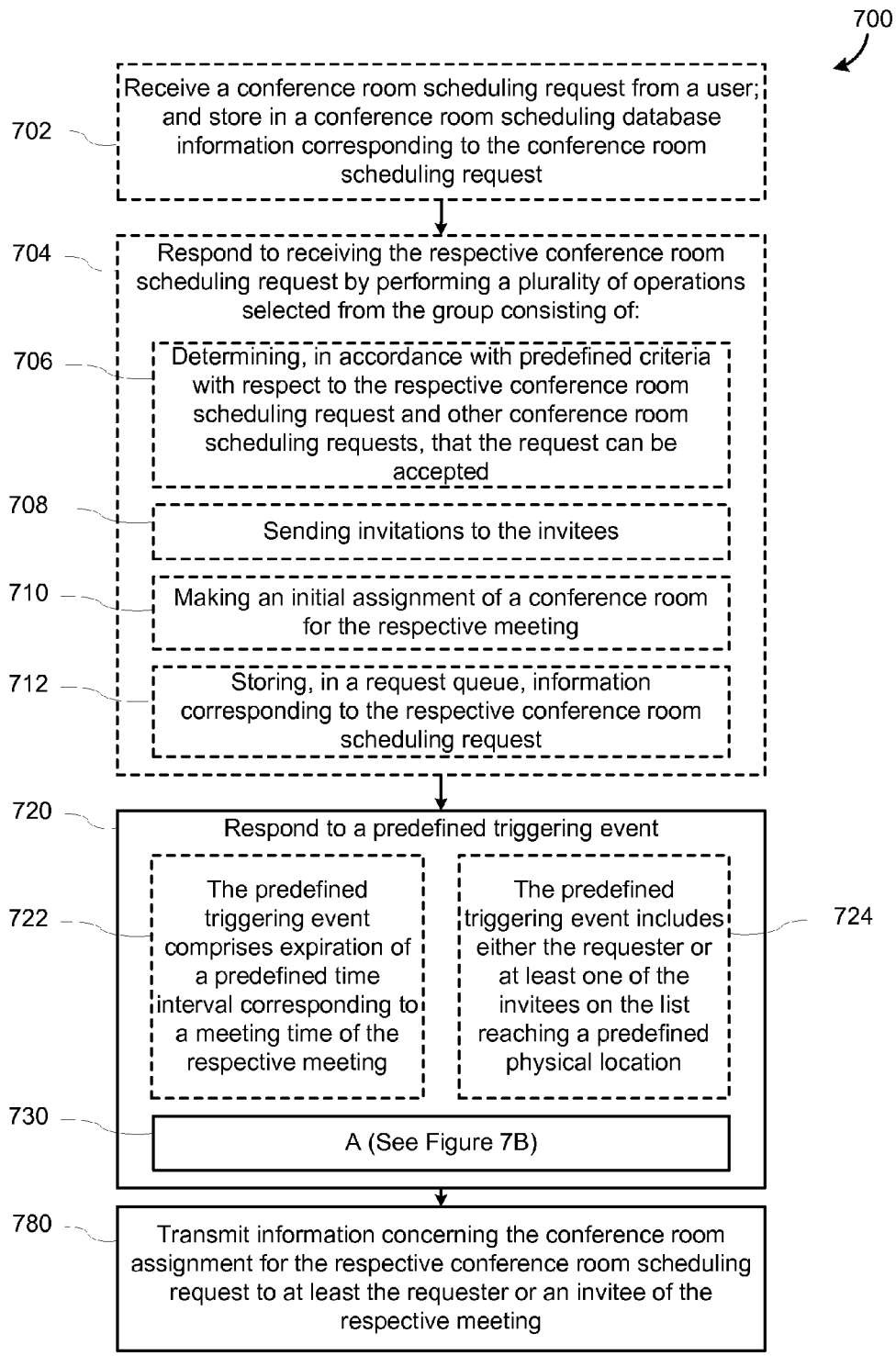
FIGS. 7A and 7B are flowcharts representing a method of assigning conference rooms to conference room scheduling requests, in response to a predefined triggering event, in a conference room scheduling system, in accordance with some embodiments.
Figure 7B:
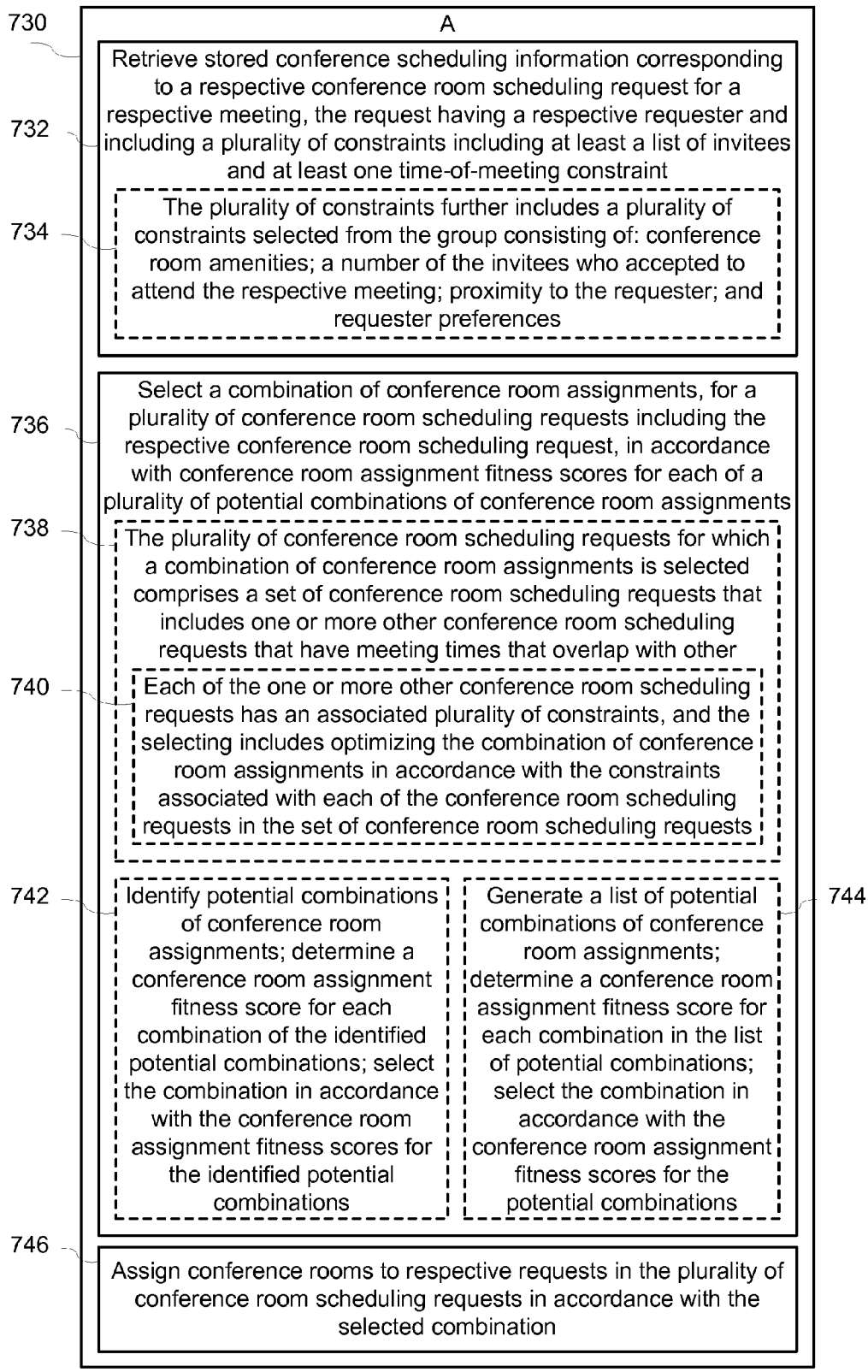

FIGS. 7A and 7B are flowcharts representing a method of assigning conference rooms to conference room scheduling requests, in response to a predefined triggering event, in a conference room scheduling system (e.g., conference room scheduling system 108), in accordance with some embodiments. In certain embodiments, the conference room scheduling system 108 includes a server. The server performs a conference room assignment process in response to a predefined triggering event (720).

In some embodiments, the predefined triggering event is expiration of a predefined time interval corresponding to a respective meeting's start time (722). For example, the predefined time interval can be set to twenty-four hours before a meeting's start time, four hours before the meeting start time, one hour before the meeting's start time, or any other time interval before the meeting. When the predefined time interval is set as twenty-four hours before the meeting, the server responds by assigning a conference room to the corresponding request twenty-four hours before the meeting start time. The server determines whether a predefined triggering event has occurred based on: the time provided by a clock (e.g., an internal clock of the server), information stored in the conference room scheduling system (e.g., meeting start time in calendar entry database 120 or time of meeting constraint in request queue 500), and the predefined time interval. The predefined time interval can be set by a user, a server system administrator or automatically in accordance with a default value.

In another example, the predefined triggering event includes either the requester or at least one of the invitees on the list reaching a predefined physical location (724). For example, when a first attendee reaches a security check point of a building and scans her badge on a badge reader, the badge reader can send the identity of the first attendee and the location of the first attendee (alternatively, the location of the badge reader) to the server, and the server responds by scheduling all of the first attendee's meetings, if any, in that building on that day. When a second attendee reaches a security check point, the server schedules all of the second attendee's meetings, if any, that have not yet been scheduled in that building.

Additional examples of predefined triggering events include a predefined time (e.g., 1:00 AM), and a manual trigger (e.g., a manual trigger that allows an administrative to force an assignment or reallocation of conference rooms). For a predefined time trigger of 1:00 a.m., the server would respond on each day at 1:00 a.m. by assigning conference rooms to respective conference room scheduling requests for that day.

In some embodiments, the predefined triggering event is a combination of two or more of the triggering conditions described above.

In response to the predefined triggering event (720, 730), the server retrieves stored conference scheduling information corresponding to a respective conference room scheduling request for a respective meeting. The request has respective requester information and includes a plurality of constraints, including at least a list of invitees and at least one time-of-meeting constraint (732, FIG. 7B). Time-of-meeting constraints, for example, include meeting start date and time, and meeting end date and time or meeting duration. In some embodiments, the list of invitees also identifies required attendees and optional attendees.

In some embodiments, the plurality of constraints further includes a plurality of constraints selected from the group consisting of: conference room amenities (e.g., conference room requirements 510); a number of the invitees who has accepted to attend the respective meeting; proximity to the requester; and requester preferences (734). In other embodiments, the constraints also include a requested location (e.g., a building, campus or city) of the meeting. In some other embodiments, the constraints for a conference room request additionally include information stored in a user information database (e.g., user information database 116).

After retrieving stored conference scheduling information, the server selects a combination of conference room assignments, for a plurality of conference room scheduling requests including the respective conference room scheduling request, in accordance with conference room assignment fitness scores for each of a plurality of potential combinations of conference room assignments (736). A conference room assignment fitness score indicates how well a set of conference room assignments satisfy a corresponding set of conference room scheduling requests. The server selects a combination of conference room assignment with the best identified conference room assignment fitness score.

In practice, a combination of conference room assignments with the best identified conference room assignment fitness score need not satisfy all the conference room requirements for the corresponding conference room scheduling requests. For example, when there is a request for a conference room larger than all available conference rooms, even the largest conference room cannot satisfy the conference room requirements of the request. In this situation, the combination of assignments will likely include an assignment of the largest available conference room to the request. The fitness score for the combination will reflect the fact that a conference room requirement was only partially satisfied.

In some embodiments, the conference room assignment fitness score is a function of several variables, including variables associated with the plurality of constraints. In one hypothetical example, for a set of conference room scheduling requests (e.g., all the requests having a start time within a given time range), the conference room assignment fitness score is a function of the room capacity and the number of attendees, such as $$S = \sum_i S_i, \text{ where}$$
$$S_i = 0, \text{ if } R_i >= N_i; \text{ and}$$
$$S_i = R_i - N_i, \text{ if } R_i < N_i;$$

where S is the conference room assignment fitness score; $S_i$ is a fitness score for each conference room i assigned to a request; $R_i$ is the room capacity for the conference room i; $N_i$ is the number of invitees for a meeting paired with the conference room i, and i is a number between 1 and the total number of conference room scheduling requests for which the fitness score is being computed. In this example, each conference room has a fitness score of zero if the room capacity is greater than, or equal to, the number of invitees (i.e., all the invitees can fit into the conference room). If the number of invitees is greater than the room capacity, the conference room has a negative fitness score, penalizing a conference room pairing to the extent the number of invitees exceeds the room capacity (e.g., if a conference room has a room capacity of five people and the number of invitees for a meeting paired with the conference room is eight, the fitness score for the conference room is minus three (five minus eight). In this example, a higher conference room assignment fitness score indicates that conference rooms are better assigned, and the maximum conference room assignment fitness score is zero. The selection process searches to find a combination of combination of conference room assignments so that the conference room assignment fitness score is the closest to the maximum conference room assignment fitness score, zero.

In the above example, and in at least some other embodiments as well, each conference room assignment fitness score is a measure of the extent to which a corresponding set of conference room assignments differs from (or matches) assignments that perfectly satisfy the requests.

In other embodiments, the conference room fitness score is calculated based on the room capacity and the number of invitees who have accepted to attend the meeting. In some other embodiments, the conference room fitness score is calculated based on the room capacity and the number of invitees who are likely to attend the meeting. The likelihood of attendance is calculated, for example, from the past attendance of the respective invitee, past acceptance of a meeting request from the requester by the respective invitee, and schedule conflict for the respective invitee. In some embodiments, the conference room fitness score is calculated based on the room capacity and the average number of attendees for a recurring meeting. The average number of attendees may be determined from the number of invitees who accepted the meeting request in the past, or from the actual attendance recorded by a sensor located in the conference room (e.g., conference room 140).

In some embodiments, the variables for the conference room assignment fitness score include the time of meeting constraint and the availability of the conference room at the time of meeting. In some other embodiments, the variables also include proximity to the requester and invitees (e.g., determined by a default location in the user information database 116) and preferences of the requester and invitees (e.g., retrieved from the user information database 116). Optionally, the variables include organizational information about the attendees, for example the department, title or rank of the requester and invitees; in such embodiments, various departments, and/or people having various titles or ranks are given priority on conference room assignments than other meeting participants.

In some embodiments, the plurality of conference room scheduling requests for which a combination of conference room assignments is selected comprises a set of conference room scheduling requests that includes one or more other conference room scheduling requests that have meeting times that overlap with other conference room scheduling requests in the set (738). For example, the server starts this process with one or more conference room scheduling requests in the request queue (e.g., Request Queue 502). More specifically, the server identifies conference room scheduling requests in the request queue that have meeting times that overlap with the respective conference room scheduling request (i.e., a request corresponding to the received triggering event). Typically, the identified requests will not include (i.e., the identification process excludes) meetings that have already started. Optionally, requests for which a conference room assignment has already been made and, further optionally, which meet additional criteria (e.g., having a start time within the next M minutes or hours) are excluded from the set of requests for which an combination of assignments is computed. If the respective conference room scheduling request has a start time of 1:00 p.m. and an end time of 2:00 p.m., the server identifies meetings that overlap with this time range (i.e., having end times after 1:00 p.m. or start times before 2:00 p.m. for that day), excluding any requests that satisfy exclusion criteria (as discussed above), and adds them to the set. Optionally, if the earliest start time and the last end time of all the meetings in the set are different from the start and end time of the respective conference room scheduling request, the server again identifies conference room scheduling requests that overlap with the requests in the set. Optionally, this process is repeated until conference room scheduling requests that overlap with any of the requests in the set are included in the set. Further, in some embodiments the set of conference room scheduling requests included in the set is constrained to include only requests for conference rooms at the same location (e.g., floor, building, campus, or city) as a request associated with the triggering event.

In some other embodiments, each of the one or more other conference room scheduling requests has an associated plurality of constraints, and the selecting includes optimizing the combination of conference room assignments in accordance with the constraints associated with each of the conference room scheduling requests in the set of conference room scheduling requests (740). As used herein, optimizing refers to a process to identify the best combination of conference room assignments.

In some embodiments, the server generates a list of potential combinations of conference room assignments, and determines a conference room assignment fitness score for each combination in the list of potential combinations. Thereafter, the server selects the combination in accordance with the conference room assignment fitness scores for the potential combinations (744). For example, if there are j conference rooms (where j is the number of conference rooms) and k conference room scheduling requests (where k is the number of conference room scheduling requests), and if j is greater than or equal to k, the number of possible combination of conference room assignments equals P(j, k) (where P(j, k) is the number of permutations, defined as j!/(j−k)!). For example, if there are three conference rooms, A, B, and C; and two scheduling requests 1 and 2, there can be six potential combinations of conference room assignments: 1-A and 2-B; 1-A and 2-C; 1-B and 2-A; 1-B and 2-C; 1-C and 2-A; and 1-C and 2-B. Then the server selects a combination with the best conference room assignment fitness score among these six combinations.

In some other embodiments, the server identifies potential combinations of conference room assignments, and determines a conference room assignment fitness score for each combination of the identified potential combinations. Thereafter, the server selects the combination in accordance with the conference room assignment fitness scores for the identified potential combinations (742). In some embodiments, there is a predefined limit on the number of possible combinations to be generated. For example, instead of generating all six possible combinations for the situation above (three conference rooms and two requests), the server randomly generates a limited number of possible combinations. If the predefined limit on the number of possible combinations is three, the server randomly generates three combinations: 1-A and 2-B; 1-B and 2-A; and 2-C and 1-B, for example. Then the server calculates the conference room assignment fitness score for each identified potential combination, and selects the combination with the best identified conference room assignment fitness score.

In some embodiments, the server uses optimization methods, such as beam search, bees algorithm, evolution algorithms including genetic algorithms, harmony search, quantum annealing, and/or a combination of said methods to identify combinations of conference room assignments for which fitness scores will be computed, although the server does not need to find the very best combination of conference room assignments.

In some embodiments where a higher conference room assignment fitness score indicates more desirable assignments of conference rooms, the best identified conference room assignment fitness score is the highest conference room assignment fitness score for the identified potential combinations of conference room assignments. In some other embodiments where a lower conference room assignment fitness score indicates more desirable assignments of conference rooms, the best identified conference room assignment fitness score is the lowest conference room assignment fitness score for the identified potential combinations of conference room assignments.

In some embodiments, the server selects a combination only if the conference room assignment fitness score for the combination exceeds a predefined threshold. If the conference room assignment fitness score does not exceed the predefined threshold, the server repeats generating potential combinations and comparing conference room assignment fitness scores until it finds a combination for which the conference room assignment fitness score exceeds the predefined threshold.

After selecting the combination of conference room assignments for the plurality of conference room scheduling requests, the server assigns conference rooms to respective requests in the plurality of conference room scheduling requests in accordance with the selected combination (746). In the example above with six potential combinations of conference room assignments, if the server selects a potential combination of conference room assignments, for example 2-C and 1-B, the server assigns the conference room B to the conference room scheduling request 1 and the conference room C to the conference room scheduling request 2. In some embodiments, one or more of the request queue 502 (FIG. 5), the conference room database 118 (FIGS. 1, 6), and the calendar entry database 120 (FIG. 4) are updated to record the conference room assignments. For example, one or more of: the conference room assignment field 512 of a request queue record 500-*y*, the scheduling information 604 of a conference room record 600-*z*, and the conference room assignment field 424 (and/or location field 416) of one or more calendar entries 400-*x* are updated in accordance with the assignment of a conference room to a respective request.

In some embodiments when one or more of the conference room scheduling requests are not assigned (e.g., due to lack of a suitable conference room), a default location (e.g., a cafeteria) is assigned to the one or more conference room scheduling requests without assignment. In other embodiments, the conference room scheduling system refuses to accept conference room scheduling requests that cannot be guaranteed an assignment (which may or may not fully satisfy the request).

After assigning conference rooms, the server transmits information concerning the conference room assignment for the respective conference room scheduling request to at least the requester or an invitee of the respective meeting (780). In some embodiments, the server transmits the information to clients 120 associated with the requester or an invitee of the respective meeting, for example via email or short message service (SMS). In some other embodiments, the server transmits the information to clients 120 associated with the requester or an invitee of the respective meeting as an update to an existing calendar entry (e.g., entry 400-*x*). Furthermore, in some embodiments, if multiple conference room scheduling requests receive assignments, information concerning the multiple conference room assignments is transmitted to the requestors and/or invitees, as described above for the respective conference room scheduling request.

In some embodiments, client 120, after receiving the information, displays the information, for example, as a pop-up message or on a conference room scheduling webpage (e.g., conference room scheduling webpage 322).

In some embodiments, the server transmits the information to a calendar system from which the requester or an invitee of the respective meeting can retrieve the information.

In some embodiments, the server transmits the information without a predefined delay after assigning conference rooms. In some other embodiments, the server transmits the information at a predefined time. For example, the predefined time can be 3:00 a.m. every day, and the server transmits the conference room assignment information at 3:00 a.m. on each day.

In some embodiments, the server transmits the information to the requester only. In other embodiments, the server transmits the information to an invitee of the respective meeting. In some other embodiments, the server transmits the information to users associated with the requester or the invitee of the respective meeting (e.g., secretary, support staff, security, etc.). In some embodiments, the server transmits the information to a group consisting of the requester, an invitee of the respective meeting, and associated users.

In some embodiments where the assigned conference room does not meet all conference room requirements for the respective conference room scheduling request, the server transmits to the requester a list of available conference rooms and conference room amenities of the available conference rooms. In some other embodiments, the server also receives from the user a selection of a conference room from the list. Then, the server assigns the conference room selected by the user to the conference room scheduling request from the user.

In some embodiments, the server performs a pre-process prior to the triggering event. The pre-process at the server includes receiving a conference room scheduling request from a user and storing in a conference room scheduling database, information corresponding to the conference room scheduling request (702). For example, the server parses the conference room scheduling request to create an entry in the conference room scheduling database (e.g., conference room scheduling database 130).

In some other embodiments, after receiving the respective conference room scheduling request, the server responds by performing a plurality of operations selected from the group of processes (704) consisting of: determining, in accordance with predefined criteria with respect to the respective conference room scheduling request and other conference room scheduling requests, that the request can be accepted (706); sending invitations to the invitees (708); making an initial assignment of a conference room for the respective meeting (710); and storing, in a request queue, information corresponding to the respective conference room scheduling request (712).

In some embodiments, the predefined criteria (see 706) include the comparison of the number of conference rooms and the number of conference room scheduling requests. For example, the server, upon receiving the respective conference room scheduling request, identifies conference room scheduling requests in the queue that have meeting times overlapping with the respective conference room scheduling request. Then the server determines whether the respective conference room scheduling request can be accepted based on the comparison of the number of identified conference room scheduling requests and the number of conference rooms. If the number of conference rooms is greater than the number of the identified conference room scheduling requests, the server determines that the respective conference room scheduling request can be accepted. On the other hand, if the number of conference rooms is less than, or equal to, the number of queued conference room scheduling requests, the server determines that the respective conference room scheduling request cannot be accepted. The conference room scheduling request that cannot be accepted is either denied or put on hold (e.g., put into a hold queue). In some other embodiments, the predefined criteria also include the conference room requirements in the conference room scheduling requests (e.g., required room capacity, required conference room amenities, etc.).

In some embodiments, the server, upon receiving the respective conference room scheduling request, makes an initial assignment of a conference room for the respective meeting (710). For example, the server identifies conference rooms that are not previously assigned to other conference room scheduling requests at the requested time of the respective meeting, and assigns one of the identified conference rooms to the respective conference room scheduling request. In some other embodiments, the server also compares the conference room requirements in the respective conference room request and amenities of the identified conference rooms in initially assigning a conference room for the respective meeting. For example, the server selects a conference room that best matches the conference room requirements, for example in accordance with the above-described fitness score as applied to that single request.

In some embodiments, the server, upon receiving the respective conference room scheduling request and accepting the request or making an initial conference room assignment (710), sends invitations to the invitees (708). In some other embodiments, the server, upon receiving the respective conference room scheduling request, stores information corresponding to the respective conference room scheduling request in a request queue (e.g., request queue 502).

In some embodiments, multiple triggering events may occur, and the server responds to respective triggering events by repeating the retrieving, selecting, and assigning for each predefined triggering event. Furthermore, the pre-process is performed multiple times, once for each received request.

Figure 8:
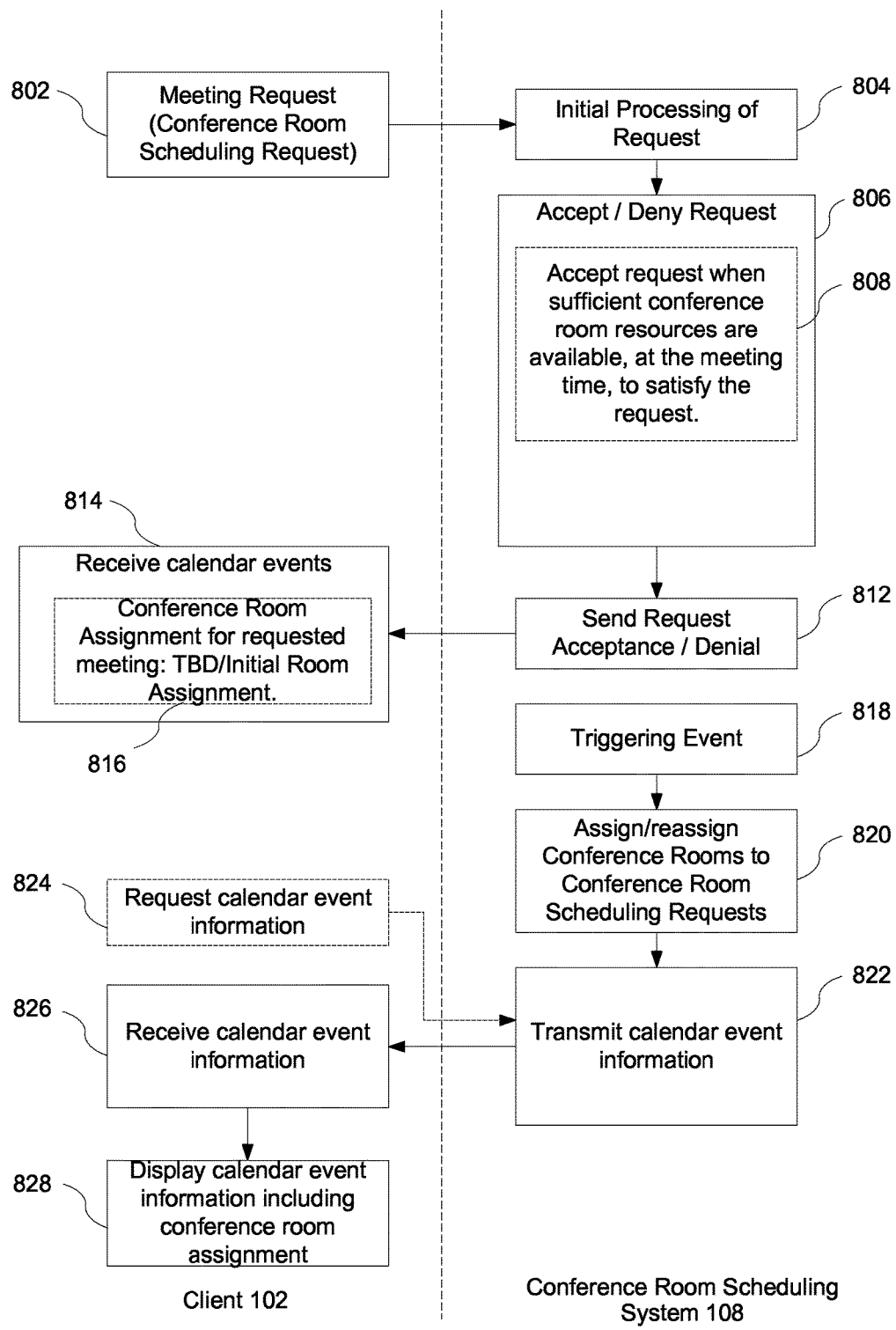
FIG. 8 is a high-level flowchart illustrating processes performed by a client and a conference room scheduling system, in accordance with some embodiments.

FIG. 8 is a high-level flowchart illustrating processes performed by a client 102 and a conference room scheduling system 108, in accordance with some embodiments. It will be appreciated by those of ordinary skill in the art that one or more of the acts described may be performed by hardware, software, or a combination thereof, as may be embodied in one or more computing systems. In some embodiments, portions of the process performed by conference room scheduling system 108 can be performed by client 102.

Client 102 sends a conference room scheduling request (802) to the conference room scheduling system 108. In some embodiments, when client 102 sends a meeting request, the meeting request includes a conference room scheduling request. In some other embodiments, the server automatically generates a conference room scheduling request from the meeting request.

In some embodiments, the meeting request is initiated by a user request for a meeting. In one example, the meeting request is initiated because a new meeting has been added to the calendar by user input or by someone acting on behalf of the user. This could be done, for example, by the client assistant 316. In another example, the user requests a meeting on a conference room scheduling webpage.

In response to the client meeting request, the conference room scheduling system 108 performs initial processing of the request (804). For example, the initial processing includes storing the request in a conference room scheduling database (e.g., 702). Thereafter, the system 108 determines whether to accept or deny the request (806). In some embodiments, the system 108 accepts the request when sufficient conference room resources are available, at the meeting time, to satisfy the request (808). Then, the system 108 sends a request acceptance or denial in accordance with the determination (812). Client 102 receives the acceptance or denial. In some embodiments, calendar events include the request acceptance or denial, and Client 102 receives calendar events including the request acceptance or denial (814). In some embodiments where the system 108 makes an initial assignment of a conference room (710), client 102 stores the initial room assignment as a conference room assignment (e.g., conference room assignment 512). In other embodiments, client 102 indicates the conference room assignment as "to-be-determined (TBD)" (816).

The system 108 receives a triggering event (818), and assigns conference rooms to conference room scheduling requests (820). In some embodiments where conference rooms are already assigned to conference room scheduling requests (e.g., by the initial assignment step in 710, or due to an earlier triggering event), the system 108 reassigns conference rooms to conference room scheduling requests (820).

In some embodiments, the system 108 transmits calendar event information, including the conference room assignment after assigning or reassigning conference rooms (822). In some other embodiments, client 102 requests calendar event information from the system 108 (824), and the system 108 responds by transmitting calendar event information (822). Client 102 receives calendar event information (826), and displays calendar event information including conference room assignment (828) on a user interface (e.g., GUI 111, FIG. 1).

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented method of scheduling conference rooms, the method comprising:
performing, by a conference room scheduling system:
receiving a plurality of scheduling requests for conference rooms, wherein:
each scheduling request corresponds to a respective meeting that has respective identified invitees,
each scheduling request requests a conference room from a designated pool of conference rooms, and
a first scheduling request in the plurality of scheduling requests specifies a meeting start time;
for at least a first subset of the scheduling requests, upon receiving a respective scheduling request in the first subset:
identifying which scheduling requests are pending, and determining that the pending scheduling requests are serviceable by the designated pool of conference rooms;

detecting, by at least one of a badge reader, a radio-frequency identification device, a biometric reader, a fingerprint scanner, a retinal scanner, a face identification device, a proximity sensor, or a motion detector, a presence of a person in a conference room;

transmitting, to the conference room scheduling system by the at least one of the badge reader, the radio-frequency identification device, the biometric reader, the fingerprint scanner, the retinal scanner, the face identification device, the proximity sensor, or the motion detector, information indicating the presence of the person in the conference room;

upon receiving, by the conference room scheduling system from the at least one of the badge reader, the radio-frequency identification device, the biometric reader, the fingerprint scanner, the retinal scanner, the face identification device, the proximity sensor, or the motion detector, the information indicating the presence of the person in the conference room, triggering, by the conference room scheduling system, a conference room assignment process, the conference room assignment process including the conference room scheduling system performing:

determining respective numbers of invitees who have accepted to attend the meetings corresponding to the scheduling requests;

identifying a second subset of the scheduling requests, wherein the second subset includes the first scheduling request; and assigning conference rooms from the designated pool of conference rooms to each scheduling request in the second subset in accordance with the plurality of scheduling requests, the respective numbers of invitees who have accepted to attend the corresponding meetings, and occupancy limits for the designated pool of conference rooms, by randomly generating a limited number of possible combinations less than all possible combinations of conference room assignments and determining a best possible combination of the limited number of possible combinations.

2. The computer-implemented method of claim 1, wherein assigning conference rooms further comprises:
calculating conference room assignment fitness scores for each of a plurality of potential combinations of conference room assignments; and
assigning conference rooms based on the calculated conference room assignment fitness scores.

3. The computer-implemented method of claim 2, wherein a conference room assignment fitness score is calculated based, at least in part, on an identified invitee's likelihood of attending a meeting corresponding to a scheduling request in the plurality of scheduling requests, the likelihood being calculated based on past attendance by the identified invitee.

4. The computer-implemented method of claim 2, wherein a conference room assignment fitness score is calculated based, at least in part, on an invitee's geographical proximity to a requester submitting a scheduling request in the plurality of scheduling requests, the geographical proximity being determined based on default locations of the requester and the invitee.

5. The computer-implemented method of claim 1, further comprising prior to the detecting the presence of the person in the conference room:
generating, by the conference room scheduling system, a provisional conference room assignment satisfying a scheduling request in the plurality of scheduling requests.

6. The computer-implemented method of claim 1, wherein the conference room is at a specified location.

7. A computer system, comprising:
a conference room scheduling system comprising one or more processors, and memory storing one or more programs to be executed by the one or more processors, the one or more programs comprising instructions for:
receiving a plurality of scheduling requests for conference rooms, wherein:
each scheduling request corresponds to a respective meeting that has respective identified invitees,
each scheduling request requests a conference room from a designated pool of conference rooms, and
a first scheduling request in the plurality of scheduling requests specifies a meeting start time;
for at least a first subset of the scheduling requests, upon receiving a respective scheduling request in the first subset:
identifying which scheduling requests are pending, and
determining that the pending scheduling requests are serviceable by the designated pool of conference rooms; and
at least one of a badge reader, a radio-frequency identification device, a biometric reader, a fingerprint scanner, a retinal scanner, a face identification device, a proximity sensor, or a motion detector configured to:
detect a presence of a person in a conference room; and
transmit, to the conference room scheduling system, information indicating the presence of the person in the conference room;
wherein the instructions comprised by the one or more programs stored by the memory comprised by the conference room scheduling system are further configured to cause the conference room scheduling system to, upon receiving, from the at least one of the badge reader, the radio-frequency identification device, the biometric reader, the fingerprint scanner, the retinal scanner, the face identification device, the proximity sensor, or the motion detector, the information indicating the presence of the person in the conference room, triggering a conference room assignment process, the conference room assignment process including the conference room scheduling system performing:
determining respective numbers of invitees who have accepted to attend the meetings corresponding to the scheduling requests;
identifying a second subset of the scheduling requests, wherein the second subset includes the first scheduling request; and
assigning conference rooms from the designated pool of conference rooms to each scheduling request in the second subset in accordance with the plurality of scheduling requests, the respective numbers of invitees who have accepted to attend the corresponding meetings, and occupancy limits for the designated pool of conference rooms, by randomly generating a limited number of possible combinations less than all possible combinations of conference room assignments and determining a best possible combination of the limited number of possible combinations.

8. The system of claim 7, wherein the instructions for assigning conference rooms further comprise instructions for:
calculating conference room assignment fitness scores for each of a plurality of potential combinations of conference room assignments; and
assigning conference rooms based on the calculated conference room assignment fitness scores.

9. The system of claim 8, wherein a conference room assignment fitness score is calculated based, at least in part, on an invitee's likelihood to attend a meeting corresponding to a scheduling request in the plurality of scheduling requests, the likelihood being calculated based on past attendance by the invitee.

10. The system of claim 8, wherein a conference room assignment fitness score is calculated based, at least in part, on an invitee's geographical proximity to a requester submitting a scheduling request in the plurality of scheduling requests, the geographical proximity being determined based on default locations of the requester and the invitee.

11. The system of claim 7, wherein the instructions comprised by the one or more programs stored by the memory comprised by the conference room scheduling system are further configured to cause the conference room scheduling system to generate a provisional conference room assignment satisfying a scheduling request in the plurality of scheduling requests prior to the detecting the presence of the person in the conference room.

12. The computer system of claim 7, wherein the conference room is at a specified location.

13. A non-transitory computer readable storage medium storing instructions that, when executed by at least one processor of a computer system, cause the computer system to at least:
receive, by a conference room scheduling system, a plurality of scheduling requests, wherein:
each scheduling request corresponds to a respective meeting that has respective identified invitees,
each scheduling request requests a conference room from a designated pool of conference rooms, and
a first scheduling request in the plurality of scheduling requests specifies a meeting start time;
for at least a first subset of the scheduling requests, upon receiving a respective scheduling request in the first subset:
identify, by the conference room scheduling system, which scheduling requests are pending; and
determine, by the conference room scheduling system, that the pending scheduling requests are serviceable by the designated pool of conference rooms;
detect, by at least one of a badge reader, a radio-frequency identification device, a biometric reader, a fingerprint scanner, a retinal scanner, a face identification device, a proximity sensor, or a motion detector, a presence of a person in a conference room;
transmit, to the conference room scheduling system by the at least one of the badge reader, the radio-frequency identification device, the biometric reader, the fingerprint scanner, the retinal scanner, the face identification device, the proximity sensor, or the motion detector, information indicating the presence of the person in the conference room;
upon receiving, by the conference room scheduling system from the at least one of the badge reader, the radio-frequency identification device, the biometric reader, the fingerprint scanner, the retinal scanner, the face identification device, the proximity sensor, or the motion detector, the information indicating the presence of the person in the conference room, triggering a conference room assignment process, the conference room assignment process including the conference room scheduling system performing:
determining respective numbers of invitees who have accepted to attend the meetings corresponding to the scheduling requests;
identifying a second subset of the scheduling requests, wherein the second subset includes the first scheduling request; and
assigning conference rooms from the designated pool of conference rooms to each scheduling request in the second subset in accordance with the plurality of scheduling requests, the respective numbers of invitees who have accepted to attend the corresponding meetings, and occupancy limits for the designated pool of conference rooms, by randomly generating a limited number of possible combinations less than all possible combinations of conference room assignments and determining a best possible combination of the limited number of possible combinations.

14. The computer readable storage medium of claim 13, wherein the instructions for assigning conference rooms further comprise instructions for:
calculating conference room assignment fitness scores for each of a plurality of potential combinations of conference room assignments; and
assigning conference rooms based on the calculated conference room fitness scores.

15. The computer readable storage medium of claim 14, wherein a conference room assignment fitness score is calculated based, at least in part, on:
an invitee's likelihood to attend a meeting corresponding to a scheduling request in the plurality of scheduling requests, or
the invitee's geographical proximity to a requester submitting a scheduling request.

16. The computer readable storage medium of claim 13, wherein the one or more instructions further comprise instructions for the conference room scheduling system to generate a provisional conference room assignment satisfying a scheduling request in the plurality of scheduling requests prior to the at least one of the badge reader, the radio-frequency identification device, the biometric reader, the fingerprint scanner, the retinal scanner, the face identification device, the proximity sensor, or the motion detector detecting the presence of the person in the conference room.

17. The computer readable storage medium of claim 13, wherein the conference room is at a specified location.

* * * * *